US011832126B2

(12) United States Patent
Chen et al.

(10) Patent No.: US 11,832,126 B2
(45) Date of Patent: Nov. 28, 2023

(54) RESTRICTIONS ON MULTI-LINK DEVICE PROBE REQUEST

(71) Applicant: Intel Corporation, Santa Clara, CA (US)

(72) Inventors: Cheng Chen, Camas, WA (US); Laurent Cariou, Milizac (FR); Po-Kai Huang, San Jose, CA (US); Ido Ouzieli, Tel Aviv (IL); Daniel F. Bravo, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 78 days.

(21) Appl. No.: 17/324,239

(22) Filed: May 19, 2021

(65) Prior Publication Data

US 2021/0274378 A1 Sep. 2, 2021

Related U.S. Application Data

(60) Provisional application No. 63/026,907, filed on May 19, 2020.

(51) Int. Cl.
*H04W 28/02* (2009.01)
*H04W 48/14* (2009.01)
*H04W 48/16* (2009.01)

(52) U.S. Cl.
CPC ....... *H04W 28/0289* (2013.01); *H04W 48/14* (2013.01); *H04W 48/16* (2013.01)

(58) Field of Classification Search
None
See application file for complete search history.

(56) References Cited

U.S. PATENT DOCUMENTS

| 11,601,999 | B2 * | 3/2023 | Chu | H04W 48/12 |
| 2021/0321243 | A1 * | 10/2021 | Patil | H04W 76/15 |
| 2022/0132611 | A1 * | 4/2022 | Fang | H04W 28/06 |
| 2022/0369403 | A1 * | 11/2022 | Fang | H04W 76/15 |

\* cited by examiner

*Primary Examiner* — Hong S Cho
(74) *Attorney, Agent, or Firm* — Schwegman Lundberg & Woessner, P.A.

(57) ABSTRACT

A non-AP STA of a multi-link device (STA MLD) may be configured to encode a multi-link (ML) probe request frame for transmission to an access point STA (AP) of an AP MLD comprising a plurality of affiliated APs. When the probe request frame is sent outside the context of active scanning, to discover an AP of the AP MLD the ML probe request frame may be encoded to have an Address 1 field set to a broadcast address and an Address 3 field set to a BSSID of the AP, or encoded to have the Address 1 field set to a basic service set identity (BSSID) of the AP's BS. The non-AP STA may refrain from transmitting the ML probe request frame to the AP of the AP MLD in a corresponding link when another non-AP STA of the AP MLD has already received a ML probe response that included complete information from any one of the APs of the AP MLD in any link.

17 Claims, 3 Drawing Sheets

US 11,832,126 B2

RESTRICTIONS ON MULTI-LINK DEVICE PROBE REQUEST

PRIORITY CLAIM

This application claims priority under 35 U.S.C. 119(e) to U.S. Provisional Patent Application Ser. No. 63/026,907, filed May 19, 2020 which is incorporated herein by reference in its entirety.

TECHNICAL FIELD

Embodiments pertain to wireless communications. Some embodiments relate to IEEE P802.11be and extremely-high throughput (EHT) networks. Some embodiments apply to restrictions on multi-link device (MLD) probe request frame transmissions.

BACKGROUND

One issue with EHT multi-link discovery is the additional overhead associated with MLD Probe Request/Response frame transmission since complete information of an MLD may be included in the frames. A channel may become severely congested by a large number of MLD Probe Request/Response frames. Thus, what is needed is a mechanism that reduces the number of MLD Probe Request/Response frames for EHT multi-link discovery.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
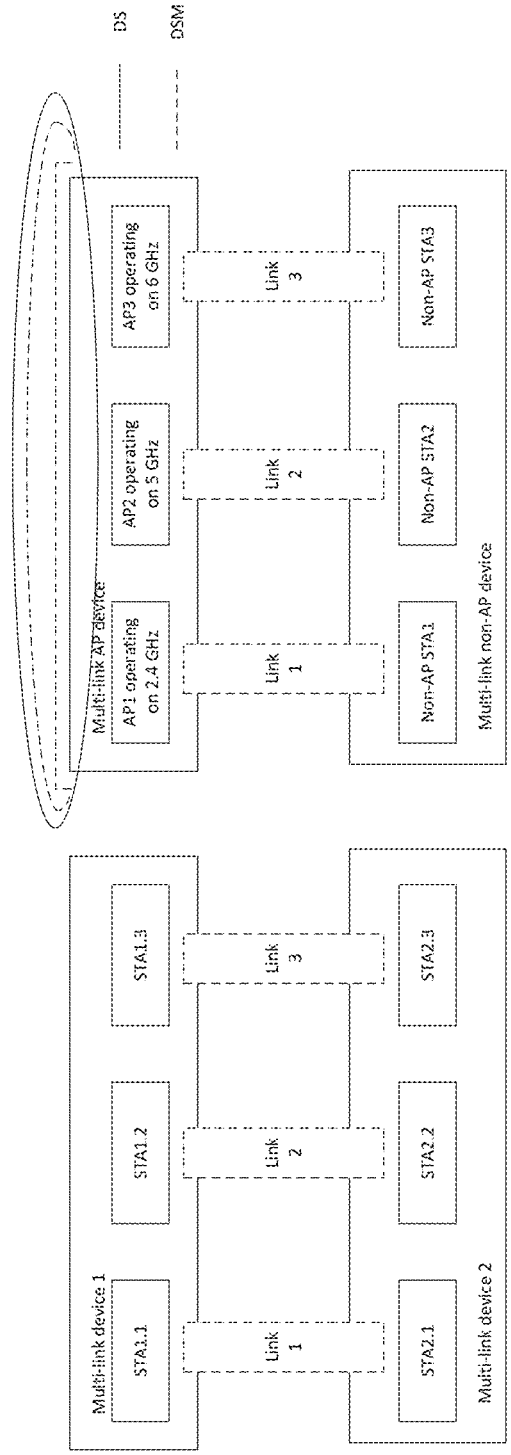
FIG. 1 illustrates a multi-link framework in accordance with some embodiments.

FIG. 1 illustrates a multi-link framework in accordance with some embodiments.

Embodiments are direct to a non-AP STA multi-link device (STA MLD) comprising a plurality of affiliated non-AP STAs (STAs). In these embodiments, a non-AP STA (STA1) of the STA MLD may be configured to encode a multi-link (ML) probe request frame for transmission to an access point STA (AP) of an AP MLD. The AP MLD may comprise plurality of affiliated APs. In these embodiments, when the probe request frame is sent outside a the context of active scanning to discover an AP of the AP MLD, the ML probe request frame may be encoded to have an Address 1 field set to a broadcast address and an Address 3 field set to a BSSID of the AP, or encoded to have the Address 1 field set to a basic service set identity (BSSID) of the AP's BSS.

In these embodiments, the non-AP STA (STA1) may refrain from transmitting the ML probe request frame to the AP of the AP MLD in a corresponding link when another non-AP STA (STA2) of the AP MLD has already received a ML probe response that included complete information from any one of the APs of the AP MLD in any link.

In some embodiments, the non-AP STA may encode the ML probe request frame for transmission in response to a MAC-Layer Management Entity (MLME) scan request (MLME-SCAN.request) message from an MLME service access point (SAP) interface of the non-AP STA. In these embodiments, the non-AP STA may refrain from encoding the ML probe request frame for transmission when the MLME-SCAN.request message has not been received from the MLME SAP interface.

In these embodiments, if one non-AP STA within the same STA MLD has already received complete information from the AP MLD, the MLME SAP interface of the STA MLD does not send the MLME-SCAN.request message to trigger another non-AP STA to send this ML Probe Request, because it has already got the complete information.

In these embodiments, none of the non-AP STAs of a non-AP MLD shall send an ML probe request to an AP of the AP MLD in the corresponding link if any non-AP STA of the same non-AP MLD has already received a ML probe response including complete information from any of the AP of the AP MLD in any link, since the MLME-SCAN.request primitive with ScanType parameter indicating an active scan was issued.

In some embodiments, when the probe request frame is sent outside the context of active scanning to discover an AP of the AP MLD, and when the ML probe request frame is encoded to have the Address 1 field set to a broadcast address and the Address 3 field set to the BSSID of the AP, or encoded to have the Address 1 field set to the BSSID of the AP's BSS, the non-AP STA may further encode the ML probe request frame to include a Probe Request variant Multi-Link element.

In some embodiments, the Probe Request variant Multi-Link element may indicate that the probe request frame is a ML probe request. In these embodiments, the ML probe request may request the AP of the AP MLD to provide information of the other APs affiliated with the AP MLD.

In some embodiments, when the probe request frame is sent within the context of active scanning, the non-AP STA may refrain from including other additional elements in the ML probe request frame.

In some embodiments, when the ML probe request frame is transmitted, the non-AP STA may decode a ML probe response frame from the AP of the AP MLD. In these embodiments, the ML probe response may include complete information from any of the APs of the AP MLD in any link. in these embodiments, when the ML probe response includes complete information from any of the APs of the AP MLD in any link, the non-AP STA may refrain from issuing a MLME-SCAN.request primitive with ScanType parameter indicating that an active scan was already issued.

In these embodiments, none of the non-AP STAs of a non-AP MLD shall send an ML probe request to an AP of the AP MLD in the corresponding link if any non-AP STA of the same non-AP MLD has already received a ML probe response including complete information from any of the AP of the AP MLD in any link, since the MLME-SCAN.request primitive with ScanType parameter indicating an active scan was issued.

In some embodiments, the ML probe request frame may include a request for complete AP MLD information. In these embodiments, the MLD probe response frame, received from the AP of the AP MLD, includes a Reduced Neighbor Report (RNR) element that identifies the APs affiliated with the AP MLD, and complete information of each of the APs affiliated with the AP MLD (see FIG. 2 for example).

In some embodiments, the AP MLD may be a logical entity comprising the plurality of affiliated AP STAs (APs), the AP MLD configured to use a single medium access control (MAC) address for transmission of MAC service data units (MSDUs) across multiple links established with the STAs of the STA MLD. In these embodiments, the STA MLD may be a logical entity comprising the plurality of affiliated non-AP STAs, the STA MLD configured to use a single MAC address for transmission of MAC service data units (MSDUs) across multiple links established with the AP MLD.

In some embodiments, the non-AP STA may refrain from transmitting the ML probe request frame to the AP of the AP MLD in a corresponding link when another non-AP STA (STA2) of the AP MLD has already received a ML probe response that included complete information from any one of the APs of the AP MLD in any link. In these embodiments, the links may be in the 6 GHz spectrum.

Some embodiments are directed to a non-transitory computer-readable storage medium that stores instructions for execution by processing circuitry a non-AP STA multi-link device (STA MLD). In these embodiments, the processing circuitry may configure a non-AP STA (STA1) of the STA MLD to encode a multi-link (ML) probe request frame for transmission to an access point STA (AP) of an AP MLD. When the probe request frame is sent outside a the context of active scanning to discover an AP of the AP MLD, the ML probe request frame may be encoded to have an Address 1 field set to a broadcast address and an Address 3 field set to a BSSID of the AP, or encoded to have the Address 1 field set to a basic service set identity (BSSLD) of the AP's BSS. In these embodiments, the processing circuitry may configure the non-AP STA (STA1) to refrain from transmitting the ML probe request frame to the AP of the AP MLD in a corresponding link when another non-AP STA (STA2) of the AP MLD has already received a ML probe response that included complete information from any one of the APs of the AP MLD in any link.

These embodiments are described in more detail below.

Mechanisms for EHT Multi-link discovery enable a non-AP MLD to discovery AP MLDs nearby prior to determining which AP MLD to associate. Basically, there are two main methods will be provided for EHT Multi-link discovery:

Basic discovery: Discover APs around, evaluate what would be the closest AP. This includes only a subset of the most essential information that describes a reported AP, such as Operating Class, Channel, BSSID, Short SSID, TBTT offset, BSS parameters, etc. it is proposed to reuse existing the reduced neighbor report (RNR) element included in Beacon and Probe Response frames to report basic information of an AP MLD. Specifically, all APs that are part of the same MLD as the reporting AP and that are collocated with the reporting AP shall be reported in the RNR element that is included in the beacons and the broadcast probe responses transmitted by the reporting AP.

Full discovery: Discover complete information of all supported links provided by an AP MLD. This includes a full set of all information related to capabilities and operation parameters of all links supported by an AP MLD. It is to define a new variant of existing Probe Request frame to enable a STA of a non-AP MLD to request the complete set of information of an AP MLD. Specifically, a mechanism may be defined for a STA of a non-AP MLD to send a probe request frame to an AP belonging to an AP MLD, that enables to request a probe response from the AP that includes the complete set of capabilities, parameters and operation elements of other APs affiliated to the same MLD as the AP.

Therefore, there is a need to differentiate between regular Probe Request/Response and MLD Probe Request/Response mechanisms. First, some definitions used in this disclosure are defined.

Regular Probe Request/Probe Responses:
  Probe request that contains mainly information on the link on which it is transmitted and generates a regular probe response that contains the RNR (minimum information—basic discovery).

MLD Probe Request/Probe Responses:
  Probe request that contains STA MLD information and requests complete MLD info on multiple links that the STA supports.
  Probe response contains complete information on AP MLD, for all links supported by the STA (or specific rules TBD).

These 2 probes are used differently by the STA:
  For basic initial discovery—use regular probe.
  For collecting complete info before Multi-link association—use MLD Probe.

Since MLD Probe Request/Response include the complete information of an MLD, the size of the frame, and consequently the overhead of sending them, would be significantly large. It could be potentially abused and thus create the problem of "Probe Storm", where the channel is severely congested by a large amount of MLD Probe Request/Response frames. In this case, it would be considered to limit the use of MLD Probe Request frames only when necessary and prohibit excessive use of them as much as possible.

In 11ax 6 GHz band, a series of rules were defined to limit the use of regular Probe Request frames for similar objective, i.e., to reduce the number of Probes in 6 GHz band that prevents the Probe Storm issue. In this disclosure, similar ideas may be applied that were adopted in 11ax 6 GHz and extend them to EHT Multi-link scenarios to place restrictions on MLD Probe Request.

Currently, there is no solution to restricting 11be EHT MLD Probe Request frames. 11ax 6 GHz rules on Probe Request frames only apply to 6 GHz band, and only apply to legacy STAs that do not support Multi-link.

Example embodiments of the present disclosure relate to systems, methods, and devices for restrictions on MLD probe request in 11be.

In one embodiment, a MLD probe request and response system may facilitate several rules to limit the use of multi-link device (MLD) Probe Request frame in different cases. The basic idea is to apply similar ideas adopted in 11ax on restricting regular Probe Request frames in 6 GHz band and extend them to extreme high throughput (EHT) MLD scenarios. The proposed restrictions on the use of MLD Probe Request will prevent possible abuse of MLD Probe Request in 11be, and therefore prevent the Probe Storm issue.

Figure 2:
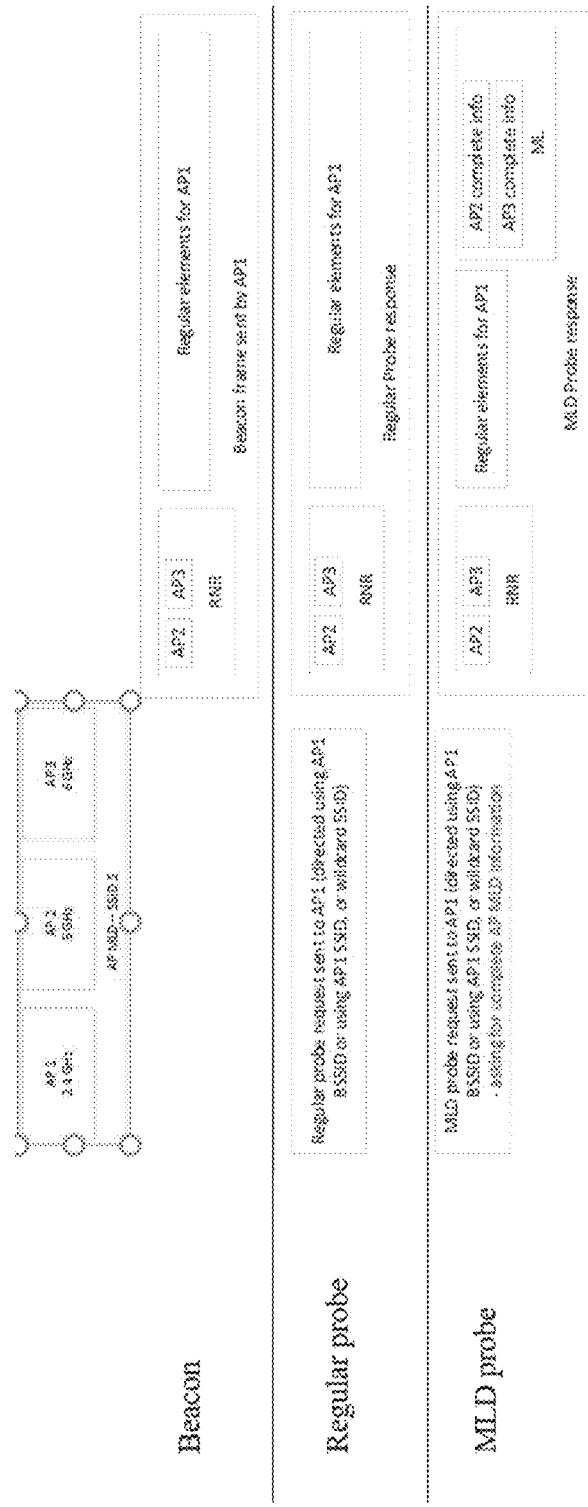
FIG. 2 illustrates the difference between a regular Probe Request/Response and a MLD Probe Request/Response in accordance with some embodiments.

FIG. 2 illustrates the difference between a regular Probe Request/Response and a MLD Probe Request/Response in accordance with some embodiments.

In one or more embodiments, a MLD probe request and response system would limit the use of MLD Probe Request from several aspects.

1. Blind MLD Probe Request:
   In 11ax, blind Probe Request is prohibited in 6 GHz band as follows:
   In 11ax 6 GHz the non-AP STA may not transmit a Probe Request frame to the broadcast destination address with the Address 3 field set to the wildcard BSSID, and the SSID set to the wildcard SSID.
   For 11 be MLD Probing, it should only be done after basic discovery. Therefore, blind MLD Probe Request should also be prohibited.
   Proposed rule in 11be: The non-AP STA affiliated with a non-AP MLD shall not transmit a MLD Probe Request frame to the broadcast destination address with the Address 3 field set to the wildcard BSSID, and the SSID set to the wildcard SSLD.
   Note that for the above restriction, the existing rule in 11ax already covers the MLD Probe Request in 6 GHz, since a MLD Probe Request is also a Probe Request. However, the prohibition also extended to 2.4/5 GHz band in terms of MLD Probe Request.
   The above proposed text only covers blind MLD Probe Request when both the BSSID and SSID are unknown. For MLD Probe Request with a known SSID but unknown BSSID (Address 3 field set to the wildcard BSSID), it may be proposed to add a list in the MLD Probe Request frame to prevent some subset of AP MLDs with the same SSID to respond.
2. Frequency of MLD Probe Request
   In 11ax, the allowed frequency of transmitting regular Probe Request is limited in 6 GHz. Similar rules may be applied regarding MLD Probe Request in all links.
   In 11ax 6 GHz, the non-AP STA shall not transmit more than one Probe Request frame to the broadcast destination address with the Address 3 field set to the wildcard BSSID and the SSID field not set to the wildcard SSID during each 20 TU period scanning the channel. The non-AP STA shall not transmit more than three Probe Request frames to the broadcast destination address with Address 3 field set to a non-wildcard BSSID during each 20 TU period scanning the channel.
   Proposed rule in 11be: A non-AP STA affiliated with a non-AP MLD shall not transmit more than TBD-1 MLD Probe Request frame to the broadcast destination address with the Address 3 field set to the wildcard BSSID and the SSID field not set to the wildcard SSID during each 20 TU period scanning the channel. The non-AP STA affiliated with a non-AP MLD shall not transmit more than TBD-2 MLD Probe Request frames to the broadcast destination address with Address 3 field set to a non-wildcard BSSID during each 20 TU period scanning the channel.
   Note: TBD-1 and TBD-2 here are two values will need to be determined in the future. For example, the values used for 11 ax 6 GHz may be reused. That is, TBD-1=one, TBD-2=Three.
3. Some Additional Rules:
   In 11ax 6 GHz, following rule exist:
   In 11ax 6 GHz, the non-AP STA shall not send a Probe Request frame to the broadcast destination address with the Address 3 field (BSSID) set to the BSSID of an AP from which it has already received a Probe Response or a Beacon frame since the start of its scanning on that channel.
   An exception in the preceding 11ax 6 GHz rule would need to be created, allowing a STA to send a MLD Probe Request frame if it has not received complete information from the AP from the Probe Response or Beacon frame.
   Proposed exception rule in 6 GHz: (Same text above) . . . , except if the non-AP STA is part of a non-AP MLD, and the Probe Response or Beacon frame it has received does not include complete information of the AP MLD.
   Except for this, similar rules would be applied in 11be, prohibiting the use of MLD Probe Request frames if the non-AP MLD has already received complete information from the AP MLD.
   Proposed rule in 11be: None of the non-AP STAs of a non-AP MLD shall send a MLD Probe Request frame to the broadcast destination address with the Address 3 field (BSSID) set to the BSSID of the AP of the AP MLD in the corresponding link if any non-AP STA of the same non-AP MLD has already received a MLD Probe Response or a Beacon frame including complete information from any of the AP of the AP MLD in any link.
   In 11ax 6 GHz, the following rule exist:
   In 11ax 6 GHz, the non-AP STA shall not send a Probe Request frame to the broadcast destination address with the SSID field and/or the Address 3 field set to the SSID and/or BSSID, respectively, of an AP for which it has received a Reduced Neighbor Report or Neighbor Report element with the Unsolicited Probe Responses Active subfield corresponding to that AP set to 1 and that indicates that the AP is operating in that channel until the FILSProbeTimer reaches dot11FILSProbeDelay.
   Again, an exception would need to be created in 11ax 6 GHz rule, allowing a STA to send a MLD Probe Request frame if the unsolicited Probe Response frame does not include complete information of the AP MLD. There are two options here:
   Option 1: define a new Unsolicited MLD Probe Response Active subfield in RNR. Only when this subfield is set to 1 then the non-AP STA of a non-AP MLD shall not send a MLD Probe Request frame.
   Option 2: Create an exception here saying:
   Proposed exception rule: except if the unsolicited probe response does not include complete information of the AP MLD, then a non-AP STA of a non-AP MLD may send a MLD Probe Request frame.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE 802.11-2016 is incorporated herein by reference. IEEE 802.11-2016 is incorporated herein by reference. IEEE P802.11-REVmd/D2.4, August 2019, and IEEE draft specification IEEE P802.11ax/D5.0, October 2019 are incorporated herein by reference in their entireties.

Figure 3:
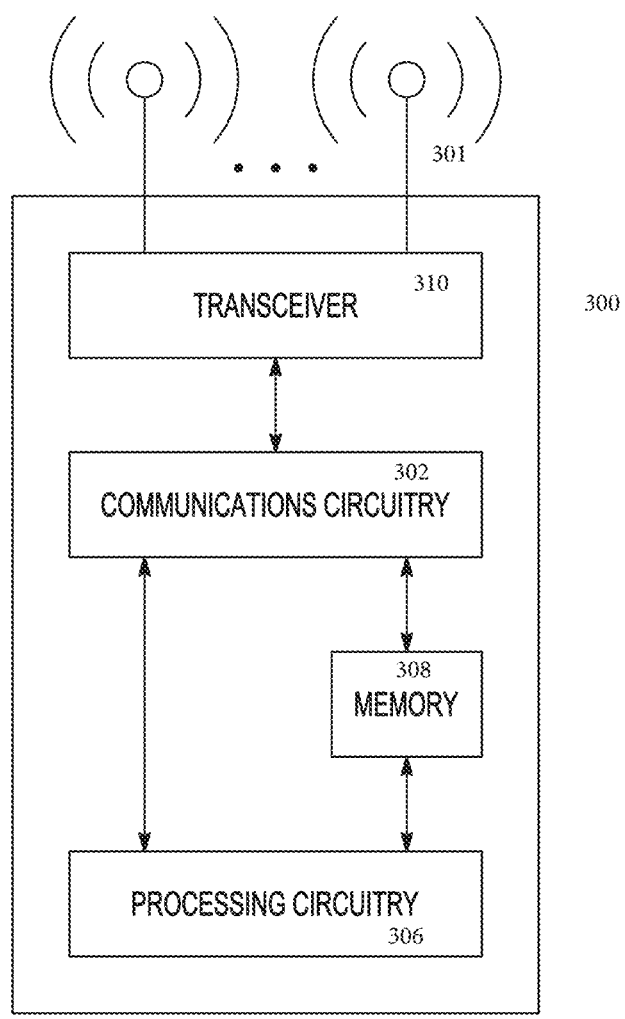
FIG. 3 is a functional block diagram of a wireless communication station (STA) in accordance with some embodiments.

In one embodiment, FIG. 3 illustrates a functional block diagram of a communication station (STA) that may be suitable for use as an AP STA, a non-AP STA or other user device in accordance with some embodiments. The communication station 300 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 300 may include communications circuitry 302 and a transceiver 310 for transmitting and receiving signals to and from other communication stations using one or more antennas 301. The communications circuitry 302 may include circuitry that can operate the physical layer (PHY) communications and/or medium access control (MAC) communications for controlling access to the wireless medium, and/or any other communications layers for transmitting and receiving signals. The communication station 300 may also include processing circuitry 306 and memory 308 arranged to perform the operations described herein. In some embodiments, the communications circuitry 302 and the processing circuitry 306 may be configured to perform operations detailed in the above figures, diagrams, and flows.

In accordance with some embodiments, the communications circuitry 302 may be arranged to contend for a wireless medium and configure frames or packets for communicating over the wireless medium. The communications circuitry 302 may be arranged to transmit and receive signals. The communications circuitry 302 may also include circuitry for modulation/demodulation, upconversion/downconversion, filtering, amplification, etc. In some embodiments, the processing circuitry 306 of the communication station 300 may include one or more processors. In other embodiments, two or more antennas 301 may be coupled to the communications circuitry 302 arranged for sending and receiving signals. The memory 308 may store information for configuring the processing circuitry 306 to perform operations for configuring and transmitting message frames and performing the various operations described herein. The memory 308 may include any type of memory, including non-transitory memory, for storing information in a form readable by a machine (e.g., a computer). For example, the memory 308 may include a computer-readable storage device, read-only memory (ROM), random-access memory (RAM), magnetic disk storage media, optical storage media, flash-memory devices and other storage devices and media.

In some embodiments, the communication station 300 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 300 may include one or more antennas 301. The antennas 301 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 300 may include one or more of a keyboard, a display, a non-volatile memory port, multiple antennas, a graphics processor, an application processor, speakers, and other mobile device elements. The display may be an LCD screen including a touch screen.

Although the communication station 300 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 300 may refer to one or more processes operating on one or more processing elements.

EXAMPLES

Example 1 may include a device comprising processing circuitry coupled to storage, the processing circuitry configured to: determine an MLD probe request frame to be sent to a first access point; cause to send the frame to a first station device of one or more station devices; and identify a probe response from the first access point.

Example 2 may include the device of example 1 and/or some other example herein, wherein the MLD probe request indicates to the first access point a request to send MLD information.

Example 3 may include the device of example 1 and/or some other example herein, wherein the probe response comprises a reduced neighbor report (RNR) associated with the first access point and Multi Link information associated with the first access point.

Example 4 may include the device of example 1 and/or some other example herein, further comprising a transceiver configured to transmit and receive wireless signals.

Example 5 may include the device of example 4 and/or some other example herein, further comprising an antenna coupled to the transceiver to cause to send the MLD probe request.

Example 6 may include a non-transitory computer-readable medium storing computer-executable instructions which when executed by one or more processors result in performing operations comprising: determining an MLD probe request frame to be sent to a first access point; causing to send the frame to a first station device of one or more station devices; and identifying a probe response from the first access point.

Example 7 may include the non-transitory computer-readable medium of example 6 and/or some other example herein, wherein the MLD probe request indicates to the first access point a request to send MLD information.

Example 8 may include the non-transitory computer-readable medium of example 6 and/or some other example herein, wherein the probe response comprises a reduced neighbor report (RNR) associated with the first access point and Multi-Link information associated with the first access point.

Example 9 may include a method comprising: determining, by one or more processors, an MLD probe request frame to be sent to a first access point; causing to send the frame to a first station device of one or more station devices; and identifying a probe response from the first access point.

Example 10 may include the method of example 9 and/or some other example herein, wherein the MLD probe request indicates to the first access point a request to send MLD information.

Example 11 may include the method of example 9 and/or some other example herein, wherein the probe response comprises a reduced neighbor report (RNR) associated with the first access point and Multi-Link information associated with the first access point.

Example 12 may include an apparatus comprising means for: determining an MLD probe request frame to be sent to a first access point; causing to send the frame to a first station device of one or more station devices; and identifying a probe response from the first access point.

Example 13 may include the apparatus of example 12 and/or some other example herein, wherein the MLD probe request indicates to the first access point a request to send MLD information.

Example 14 may include the apparatus of example 12 and/or some other example herein, wherein the probe response comprises a reduced neighbor report (RNR) associated with the first access point and Multi-Link information associated with the first access point.

Example 15 may include one or more non-transitory computer-readable media comprising instructions to cause an electronic device, upon execution of the instructions by one or more processors of the electronic device, to perform one or more elements of a method described in or related to any of examples 1-14, or any other method or process described herein.

Example 16 may include an apparatus comprising logic, modules, and/or circuitry to perform one or more elements of a method described in or related to any of examples 1-14, or any other method or process described herein.

Example 17 may include a method, technique, or process as described in or related to any of examples 1-14, or portions or parts thereof.

Example 18 may include an apparatus comprising: one or more processors and one or more computer readable media comprising instructions that, when executed by the one or more processors, cause the one or more processors to perform the method, techniques, or process as described in or related to any of examples 1-14, or portions thereof.

Example 19 may include a method of communicating in a wireless network as shown and described herein.

Example 20 may include a system for providing wireless communication as shown and described herein.

Example 21 may include a device for providing wireless communication as shown and described herein.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a non-Access Point station (non-AP STA), the non-AP STA configured to operate as an affiliated STA of a non-AP STA multi-link device (STA MLD) comprising a plurality of affiliated non-AP STAs, the apparatus comprising: processing circuitry; and memory,
    wherein the processing circuitry is to configure the non-AP STA of the STA MLD to encode a multi-link (ML) probe request frame for transmission to an access point STA (AP) of an AP MLD, the AP MLD comprising a plurality of affiliated APs,
    wherein when the ML probe request frame is sent outside a context of active scanning to discover the AP of the AP MLD, the ML probe request frame is encoded to have an Address 1 field set to a broadcast address and an Address 3 field set to a BSSID of the AP, and
    wherein the processing circuitry is configured to encode the ML probe request frame for transmission in response to a MLME-SCAN.request message from a Media Access Control (MAC) Sublayer Management Entity (MLME) Service Access point (SAP) interface.

2. The apparatus of claim 1, wherein when the ML probe request frame is sent outside the context of active scanning to discover an AP of the AP MLD, and when the ML probe request frame is encoded to have the Address 1 field set to a broadcast address and the Address 3 field set to the BSSID of the AP, or encoded to have the Address 1 field set to the BSSID of the AP's BSS:
    the processing circuitry is configured to further encode the ML probe request frame to include a Probe Request variant Multi-Link element.

3. The apparatus of claim 2, wherein the Probe Request variant Multi-Link element indicates that the ML probe request frame is a ML probe request which requests the AP of the AP MLD to provide information of other of the affiliated APs of the AP MLD.

4. The apparatus of claim 3, wherein in response to transmission of the ML probe request frame, the processing circuitry is configured to decode a ML probe response frame from the AP of the AP MLD,
    wherein when the ML probe response includes complete information from any of the APs of the AP MLD in any link, the processing circuitry is configured to refrain from issuing a MLME-SCAN.request primitive with ScanType parameter indicating that an active scan was already issued, and
    when the ML probe response does not include complete information from any of the APs of the AP MLD in any link, the processing circuitry is configured to issue the MLME-SCAN.request primitive to initiate an active scan.

5. The apparatus of claim 3, wherein the ML probe request frame includes a request for complete AP MLD information; and
    wherein the MLD probe response frame, received from the AP of the AP MLD, includes a Reduced Neighbor Report (RNR) element that identifies the APs affiliated with the AP MLD, and complete information of the APs affiliated with the AP MLD.

6. The apparatus of claim 3, wherein the processing circuitry is to configure the non-AP STA to refrain from transmitting the ML probe request frame to the AP of the AP MLD when another non-AP STA of the AP MLD has received a ML probe response that included complete information from any one of the APs of the AP MLD.

7. The apparatus of claim 3, wherein the processing circuitry is configured to refrain from encoding the ML probe request frame for transmission when the MLME-SCAN.request message has not been received from the MLME SAP interface.

8. The apparatus of claim 3, wherein when the ML probe request frame is sent in the context of active scanning, the processing circuitry is to refrain from including additional elements in the ML probe request frame.

9. The apparatus of claim 3, wherein the processing circuitry is to configure the non-AP STA to refrain from transmitting the ML probe request frame to the AP of the AP MLD in a corresponding link when another non-AP STA of the AP MLD has already received a ML probe response that included complete information from any one of the APs of the AP MLD in any link, the links being in a 6 GHz spectrum.

10. The apparatus of claim 3, wherein the STA MLD is a logical entity comprising the plurality of affiliated non-AP STAs, the STA MLD configured to use a single medium access control (MAC) for transmission of MAC service data units (MSDUs) across multiple links established with the AP MLD.

11. The apparatus of claim 1, wherein the processing circuitry and the memory are part of the non-AP STA of the STA MLD, and wherein the memory is configured to store the ML probe request frame.

12. A non-transitory computer-readable storage medium that stores instructions for execution by processing circuitry of a non-Access Point station (non-AP STA), the non-AP STA configured to operate as an affiliated STA of a non-AP STA multi-link device (STA MLD) comprising a plurality of affiliated non-AP STAs,
wherein the processing circuitry is to configure the non-AP STA of the STA MLD to encode a multi-link (ML) probe request frame for transmission to an access point STA (AP) of an AP MLD, the AP MLD comprising a plurality of affiliated APs,
wherein when the ML probe request frame is sent outside a context of active scanning to discover the AP of the AP MLD, the ML probe request frame is encoded to have an Address 1 field set to a broadcast address and an Address 3 field set to a B SSID of the AP, and
wherein the processing circuitry is configured to encode the ML probe request frame for transmission in response to a MLME-SCAN.request message from a Media Access Control (MAC) Sublayer Management Entity (MLME) Service Access point (SAP) interface.

13. The non-transitory computer-readable storage medium of claim 12, wherein when the ML probe request frame is sent outside the context of active scanning to discover an AP of the AP MLD, and when the ML probe request frame is encoded to have the Address 1 field set to a broadcast address and the Address 3 field set to the BSSID of the AP, or encoded to have the Address 1 field set to the BSSID of the AP's BSS:
the processing circuitry is configured to further encode the ML probe request frame to include a Probe Request variant Multi-Link element.

14. The non-transitory computer-readable storage medium of claim 13, wherein the Probe Request variant Multi-Link element indicates that the ML probe request frame is a ML probe request which requests the AP of the AP MLD to provide information of other of the affiliated APs of the AP MLD.

15. The non-transitory computer-readable storage medium of claim 14, wherein in response to transmission of the ML probe request frame, the processing circuitry is configured to decode a ML probe response frame from the AP of the AP MLD,
wherein when the ML probe response includes complete information from any of the APs of the AP MLD in any link, the processing circuitry is configured to refrain from issuing a MLME-SCAN.request primitive with ScanType parameter indicating that an active scan was already issued, and
when the ML probe response does not include complete information from any of the APs of the AP MLD in any link, the processing circuitry is configured to issue the MLME-SCAN.request primitive to initiate an active scan.

16. An apparatus of a non-AP STA multi-link device (STA MLD), the apparatus comprising: processing circuitry; and memory, wherein the STA MLD comprises a plurality of affiliated non-AP STAs (STAs),
wherein the processing circuitry is to configure a non-AP STA of the STA MLD to encode a multi-link (ML) probe request frame for transmission to an access point STA (AP) of an AP MLD in response to a MLME-SCAN.request message from an MLME SAP interface, the AP MLD comprising a plurality of affiliated APs, and
wherein when the ML probe request frame is sent outside a context of active scanning to discover the AP of the AP MLD, the ML probe request frame is encoded to have an Address 1 field set to a broadcast address and an Address 3 field set to a BSSID of the AP.

17. The apparatus of claim 16, wherein the processing circuitry is configured to refrain from encoding the ML probe request frame for transmission when the MLME-SCAN.request message has not been received from the MLME SAP interface, and
wherein the MLME-SCAN.request message when issued, indicates that another non-AP STA of the AP MLD has received a ML probe response that included complete information from any one of the APs of the AP MLD.

* * * * *

UNITED STATES PATENT AND TRADEMARK OFFICE
CERTIFICATE OF CORRECTION

PATENT NO. : 11,832,126 B2
APPLICATION NO. : 17/324239
DATED : November 28, 2023
INVENTOR(S) : Chen et al.

Page 1 of 1

It is certified that error appears in the above-identified patent and that said Letters Patent is hereby corrected as shown below:

In the Claims

In Column 11, Line 34, in Claim 12, delete "B SSID" and insert --BSSID-- therefor Signed and Sealed this
Second Day of September, 2025

Coke Morgan Stewart
*Acting Director of the United States Patent and Trademark Office*